_UNITED STATES PATENT OFFICE._

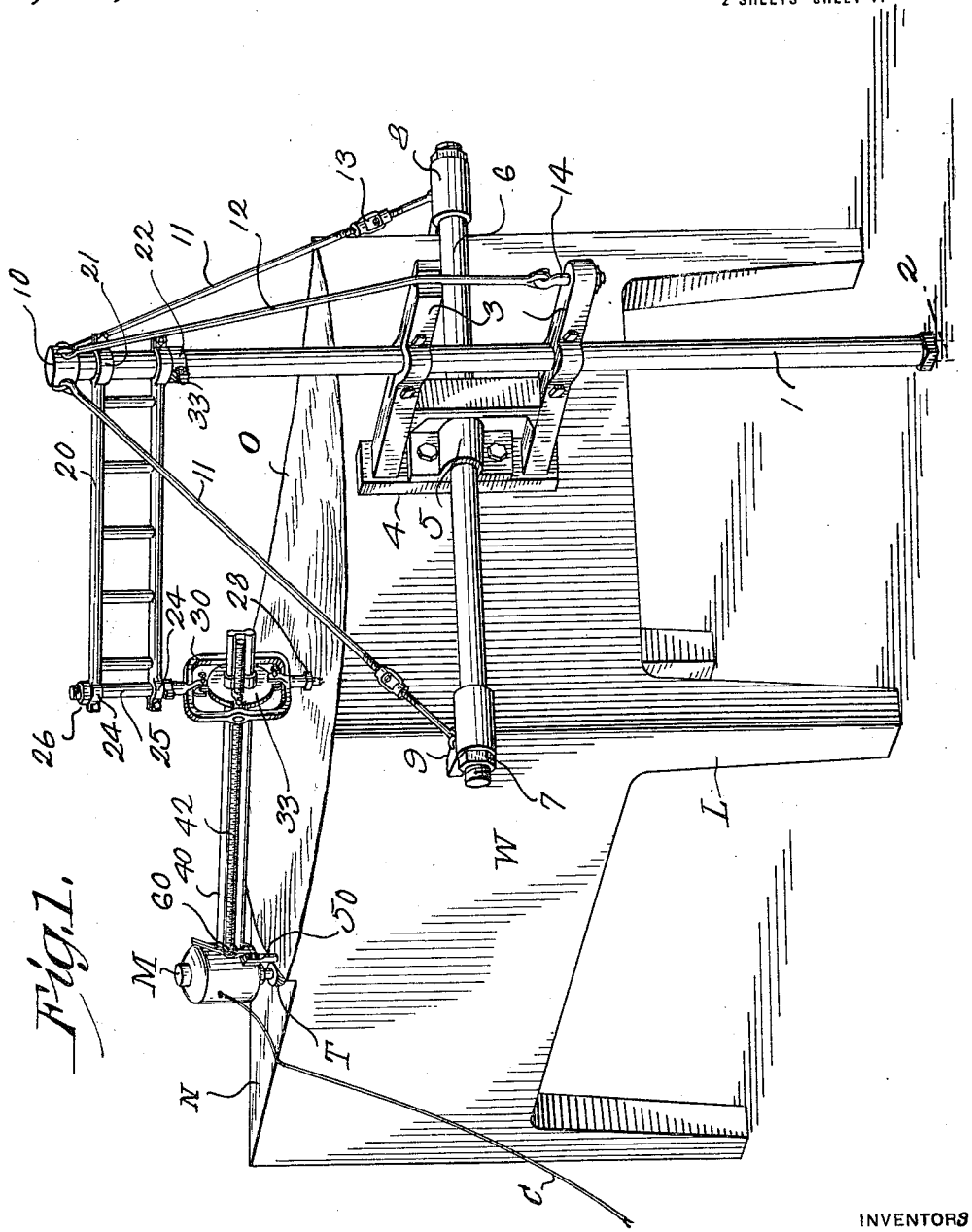

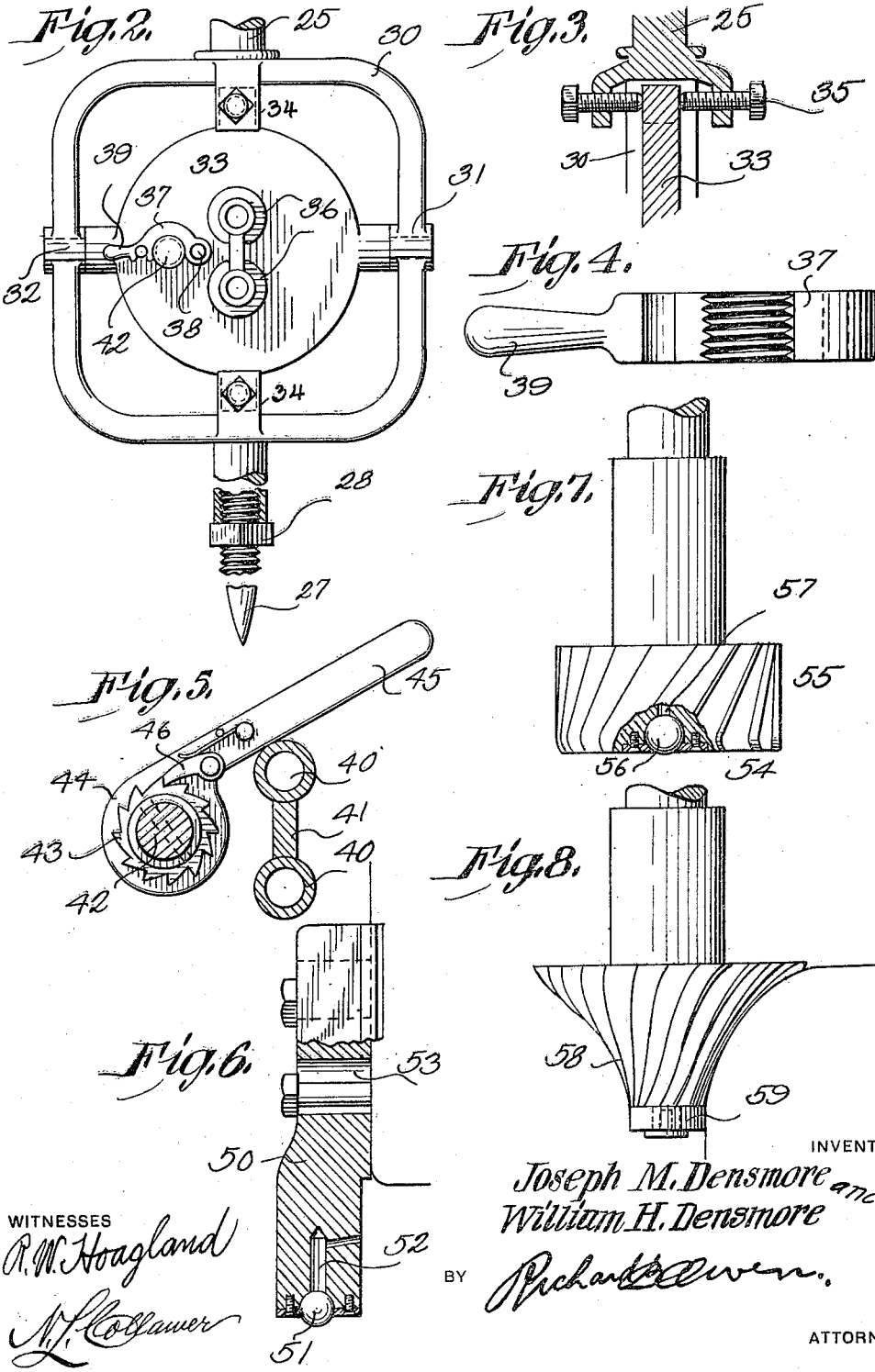

JOSEPH M. DENSMORE AND WILLIAM H. DENSMORE, OF ASHLAND, OREGON.

MEAT-BLOCK SURFACER.

1,273,043.   Specification of Letters Patent.   Patented July 16, 1918.

Application filed March 15, 1918. Serial No. 222,633.

*To all whom it may concern:*

Be it known that we, JOSEPH M. DENSMORE and WILLIAM H. DENSMORE, citizens of the United States, residing at Ashland, in the county of Jackson and State of Oregon, have invented certain new and useful Improvements in Meat-Block Surfacers, of which the following is a specification.

This invention relates to woodworking, and more particularly to special machines for cutting off a worn or damaged surface; and the object of the same is to produce a machine of this type adapted especially to resurface a meat block such as is used by butchers on which to chop and cut the meat. The surface of these blocks becomes ridged, uneven, injured, and sometimes split after long use, and they require dressing down as by cutting off a part of the upper end of the block so as to re-surface the same; and it is the purpose of this invention to devise a machine which may be clamped to a block of this kind and which will support a small electric motor actuating a suitable tool or tools, in such manner that the motor may be moved to and fro across the surface and the tools will cut away the worn or damaged portion thereof, leaving a new surface in a manner which will be clear. Yet we might say at this point that although the invention is intended particularly for meat blocks, it is quite possible that it could be employed to resurface other articles, perhaps not necessarily of wood.

The invention consists in the structure of the machine as hereinafter more fully described and claimed, and as shown in the drawings, wherein:—

Figure 1 is a perspective view of this entire machine, showing it clamped to one end of a meat block and its cutting tool at work on the surface thereof, Fig. 2 is an enlarged elevation of the cross head, Fig. 3 a sectional detail of the tilting mechanism for the disk in said cross head, Fig. 4 is an enlarged bottom view of the half nut, Fig. 5 is a section through the arm and feed screw, and an elevation of the feed lever, Fig. 6 is a detail partly in section of the gage, Figs. 7 and 8 are details respectively of the end cutter and the side cutter.

The work W in the present case is a meat block mounted on upright legs L and having an old surface O which is to be cut away so as to leave a new surface N. As well known these blocks are usually formed with the grain standing vertical so that the cutting must be done across the grain instead of with it. Moreover, long use of a meat block has saturated it with the juices of the articles chopped and cut thereon, and the wood may be said to be thoroughly saturated or water-logged at the upper end or along the upper portion of the block and for a considerable distance down into it. This necessitates the use of a rotating tool driven at a high rate of speed and having cutters on its lower end to cut away the ends of the grain, as well as cutters along its sides to cut away the sides of the old surface remaining, as best seen in Fig. 1 of the drawings; and also we make use of a side cutter shown in Fig. 8 for giving the finished rounded corner to the block when the work is completed. These tools T are preferably driven by an electric motor broadly indicated by the letter M, the power being supplied thereto by wires in a cable C led from a suitable source of energy not necessary to show; and it is the mechanism for supporting this motor and this tool or tools and permitting the same to be moved to and fro in all directions over the block, which forms the subject matter of the present invention.

An upright cylindrical post 1 may have a screw 2 at its lower end to embed the floor at a point adjacent one end of the block W to be treated. Mounted on this post are the two arms 3 of a bracket whose inner end may well rest against the end of the block W, and this end carries a clip 5 through which passes a cross bar 6 threaded at both ends for the reception of nuts 7. Upon the bar just inside said nuts are sleeves 8, each having a finger 9 adapted to be passed over one side of the block, and when the nuts are set up tight these fingers grasp the block W so that the cross bar is clamped firmly thereon and the bracket and post held relatively with respect to the work about as seen in Fig. 1. At the upper end of the post is a cap 10 from which depend rods 11, 11 and 12, two of the same having turn-buckles 13 within their length and being connected with the fingers 9, and the third rod 12 passing over the end of the upper arm 3 and being connected with a hook 14 in the lower arm as seen in the foreground of Fig. 1. Thus the cross bar and bracket are held at an appropriate height on the post 1 so that, when the cross bar is gripped to the work W, the bracket and post are fixed with respect thereto, especially when the lower end of the post embeds the floor as seen at 2.

The numeral 20 designates a swinging bracket having eyes 21 at the inner ends of the parallel arms of which it is composed, these eyes loosely embracing the upper end of the post and the lowermost resting upon a collar 22 which is clamped around the post at the desired height as at 23; and therefore when the post is strictly vertical the bracket may swing from side to side in a strictly horizontal plane. The bracket is by preference rather light, although it should be well braced as it must carry the parts yet to be referred to. The outer extremities of these arms have eyes 24 in which is rotatably mounted the upper trunnion 25 of the cross head best shown in Fig. 2, the upper end of said trunnion threaded for the reception of a nut 26 for adjusting the vertical position of said cross head. The lower trunnion is preferably adjustable by means of a screw 27 which may embed the old surface O of the block, the screw being held by a nut 28 as seen in Fig. 2.

The cross head may be said to embrace a frame and a disk. The frame 30 is rigidly interposed between and may be an integral part of the upper and lower trunnions, and it has bearings 31 at its opposite sides. In these are journaled the trunnions 32 of a disk 33 standing practically in a vertical plane and fully inclosed within the frame. Lips 34 depending from the upper portion of the frame and rising from the lower portion at opposite sides of the edges of said disk, afford supports for set screws 35 which are tapped through the lips and have their tips bearing against the disk as best seen in Fig. 3; and by properly adjusting these set screws it will be obvious that the exact position of the disk with reference to the upright plane of the frame may be regulated to great nicety. The disk has at about its center a pair of guides 36, and adjacent the same a half-nut 37 is pivoted at the point 38 to the disk and has a handle 39 for use as described below.

The electric motor M referred to above is carried rigidly at the outer end of an arm which constitutes another element of this machine. The arm in the present case has upper and lower tubular members 40 connected by a web 41 as best seen in section in Fig. 5, so as to give it great strength and rigidity consistent with its weight, and this arm is slidably mounted through the guides 36 in the disk. A screw 42 is swiveled at its outer end at 60 in the motor, adjacent which it has fast upon its body a ratchet 43, and loosely mounted on the screw adjacent the ratchet is an eye 44 at the inner end of a hand lever 45, which lever carries a pawl 46 engaging said ratchet. When now this hand lever is reciprocated, it is obvious that the screw will be turned. The screw passes loosely through the disk and may be engaged by the half-nut 37 by swinging the latter down onto the screw as seen in Fig. 2; and therefore when the screw is turned by means of a hand lever 45, the entire arm is drawn through the disk and the motor and tool caused to approach the cross head. In order to reset the parts substantially in the position shown in Fig. 1, the half-nut is raised, when the arm and screw may be slipped outward again in a manner which will be clear.

Secured to the shell or casing of the motor is a gage 50 best seen in Fig. 6, the same by preference having an anti-friction ball 51 mounted in a socket in its lower end, and an oil cavity 52 by means of which lubricant may be supplied to said ball as the latter travels over the new surface N when using the tool shown in Fig. 8 for rounding off the corners. Adjustment of the position of this gage is effected by bolts and slots as indicated at 53. The end cutting tool 54 is best shown in Fig. 7, its knives 55 extending along the lower face of the tool and preferably up its sides as seen at 55. This tool also may be provided with an anti-friction ball 56 lubricated as at 57. The side cutter or corner trimming tool 58 is best seen in Fig. 8 where an outline of the rounded corner of the block is shown. This tool may well carry an anti-friction roller 59 at its lower end to prevent its cutting knives from chipping away too much of the work. Yet I would not be limited to the specific construction of the gage and tools, because these of course will depend on the work to be done. If, as suggested, the machine is employed for re-surfacing a meat block, these tools will probably be useful and in fact necessary; but if the machine is employed for other work, appropriate tools will be required. The use of the machine is obvious. Having set up the parts about as seen in Fig. 1, doubtless the point 27 will be embedded in the old surface O as shown, the current turned on to the motor M, and the arms swung from side to side to cut away the surface and leave the new surface N, the work being done on an arc or possibly a complete circle and the motor and tool being gradually drawn toward the cross head by manipulating the hand lever 45 from time to time. The point 27 can then be withdrawn from the old surface O and the bracket 20 swung to a new position, the half-nut 37 raised, the arm and motor run out again, and the work continued in the manner above described.

What is claimed as new is:

1. In a machine of the class described, the combination with an upright post, a bracket mounted thereon and having a clip, a cross bar extending through said clip and having threaded extremities, nuts on the latter, and a sleeve mounted on the bar inside each nut and having a finger; of a collar fast on said post at its upper end, a bracket having eyes mounted on the post above said collar, and a tool carried by said bracket.

2. In a machine of the class described, the combination with an upright post, a bracket mounted thereon and having a clip, a cross bar extending through said clip and having threaded extremities, nuts on the latter, sleeves adjustably mounted on the ends of said cross bar and having fingers to engage the work, a cap at the upper end of the post, and rods depending therefrom to the sleeves and to the bracket; of another bracket loosely mounted to swing around the upper end of the post, and a tool carried by this bracket.

3. In a machine of the class described, the combination with an upright post, and a work-clamp carried thereby for holding the post adjacent the work; of a bracket mounted to swing around the upper end of the post, a cross head having an upright trunnion swivelly mounted in the outer end of this bracket, guides carried by said cross head, arms slidably mounted through said guides, and a motor and tool carried by said arms.

4. In a machine of the class described, the combination with an upright post, and a work-clamp carried thereby for holding the post adjacent the work; of a bracket mounted to swing around the upper end of the post, a cross head having an upright trunnion swivelly mounted in the outer end of this bracket, a lower trunnion on the cross head adapted to engage the work, a disk mounted within the cross head and having guides, an arm slidably mounted through the latter and carrying a motor and tool, and means for tilting the disk.

5. In a machine of the class described, the combination with an upright post; of a bracket mounted to swing around the upper end of the post, a cross head having an upright trunnion swivelly mounted in the outer end of this bracket, a lower trunnion on the cross head adapted to engage the work, a disk mounted within the cross head and having guides, an arm slidably mounted through the latter and carrying a motor and tool, trunnions at the sides of the disk mounted in bearings in the cross head, spaced lips on the cross head at right angles to the line of the trunnions, and set screws through said lips against opposite sides of the disk.

6. In a machine of the class described, the combination with an upright post, and a work-clamp carried thereby for holding the post adjacent the work; of a bracket mounted to swing around the upper end of the post, a frame having an upper trunnion swivelly mounted in the outer end of said bracket arm and a lower trunnion engaging the work, bearings at the sides of said frame, a disk having side trunnions mounted in these bearings, means for tilting the disk and setting it within the frame, guides carried by the disk, parallel arms slidably mounted through said guides, means for adjusting them therein, and a motor and tool at the outer ends of said arms.

7. In a machine of the class described, the combination with an upright support, a bracket mounted to swing around the same, a frame swivelly supported in the outer end of said bracket, and a disk adjustably mounted within the frame; of guides through the disk and a hole adjacent them, a pair of arms extending through the guides and carrying a motor at their outer ends, a screw swiveled in the motor casing and extending through said hole, means for manually turning the screw, and a half-nut pivoted to the disk and adapted to set across said hole with its threads in engagement with those on the screw.

8. In a machine of the type described, the combination with an upright support, a bracket mounted to swing around the support, a cross head swivelly mounted in the outer end of the bracket, and an arm adjustable through said cross head; of a motor whose casing is carried at the outer end of said arm, a tool on the lower end of the motor-shaft, and a gage adjustably mounted on the motor casing adjacent the tool.

In testimony whereof we affix our signatures in presence of two witnesses.

JOSEPH M. DENSMORE.
WILLIAM H. DENSMORE.

Witnesses:
W. J. MOORE,
E. M. THAYER.

Copies of this patent may be obtained for five cents each, by addressing the "Commissioner of Patents, Washington, D. C."